(12) United States Patent
Bruhat et al.

(10) Patent No.: US 7,360,555 B2
(45) Date of Patent: Apr. 22, 2008

(54) GAS REGULATOR WITH ALTIMETRIC ADJUSTMENT

(75) Inventors: Pascal Bruhat, La Roche Noire (FR); Daniel Bouvier, Paris (FR)

(73) Assignees: Clesse Industries, Cournon d'Auvergne (FR); Compagnie des Gaz de Petrole Primagaz, Paris (FR)

( * ) Notice: Subject to any disclaimer, the term of this patent is extended or adjusted under 35 U.S.C. 154(b) by 183 days.

(21) Appl. No.: 10/538,797

(22) PCT Filed: Dec. 19, 2003

(86) PCT No.: PCT/FR03/03840

§ 371 (c)(1),
(2), (4) Date: Oct. 13, 2005

(87) PCT Pub. No.: WO2004/059413

PCT Pub. Date: Jul. 15, 2004

(65) Prior Publication Data

US 2006/0060660 A1    Mar. 23, 2006

(30) Foreign Application Priority Data

Dec. 23, 2002  (FR)  .................................. 02 16554

(51) Int. Cl.
*G05D 16/02* (2006.01)
*F16K 17/30* (2006.01)
*F16K 31/68* (2006.01)

(52) U.S. Cl. ................. 137/460; 137/468; 137/505.14; 137/505.46; 137/556

(58) Field of Classification Search ................ 137/505, 137/505.14, 505.46, 556, 556.3, 556.6, 116.5 I, 137/460, 468

See application file for complete search history.

(56) References Cited

U.S. PATENT DOCUMENTS

| 2,307,199 | A |   | 1/1943  | Cooper |
|-----------|---|---|---------|--------|
| 2,729,236 | A | * | 1/1956  | Valince ................. 137/505.46 |
| 3,693,652 | A | * | 9/1972  | Iung ...................... 137/505.34 |
| 3,699,998 | A | * | 10/1972 | Baranowski, Jr. ...... 137/505.42 |
| 5,174,326 | A | * | 12/1992 | Steinert et al. ............. 137/468 |
| 5,203,371 | A | * | 4/1993  | Teay ........................... 137/460 |
| 5,423,342 | A |   | 6/1995  | Fenner, Jr. ............. 137/505.14 |
| 5,755,254 | A | * | 5/1998  | Carter et al. ................ 137/340 |
| 6,341,620 | B1|   | 1/2002  | Mutter |
| 6,691,735 | B1| * | 2/2004  | Harneit ....................... 137/505 |

FOREIGN PATENT DOCUMENTS

| FR | 1 167 883 A  | 12/1958 |
| FR | 2 786 865 A1 | 6/2000  |
| FR | 2 807 833 A1 | 10/2001 |

* cited by examiner

*Primary Examiner*—Stephen M. Hepperle
(74) *Attorney, Agent, or Firm*—Oliff & Berridge, PLC

(57) ABSTRACT

The invention relates to a gas regulator which is intended to be mounted on a gas delivery pipe connecting a gas source to a user device. The inventive regulator comprises a pressure regulation mechanism which is controlled by the movement of a mobile element. The invention is characterised in that it comprises a casing housing at least one adjustable prestressed actuator which acts on the aforementioned mobile element and which can be used to take account of the altimetric pressure variation.

15 Claims, 2 Drawing Sheets

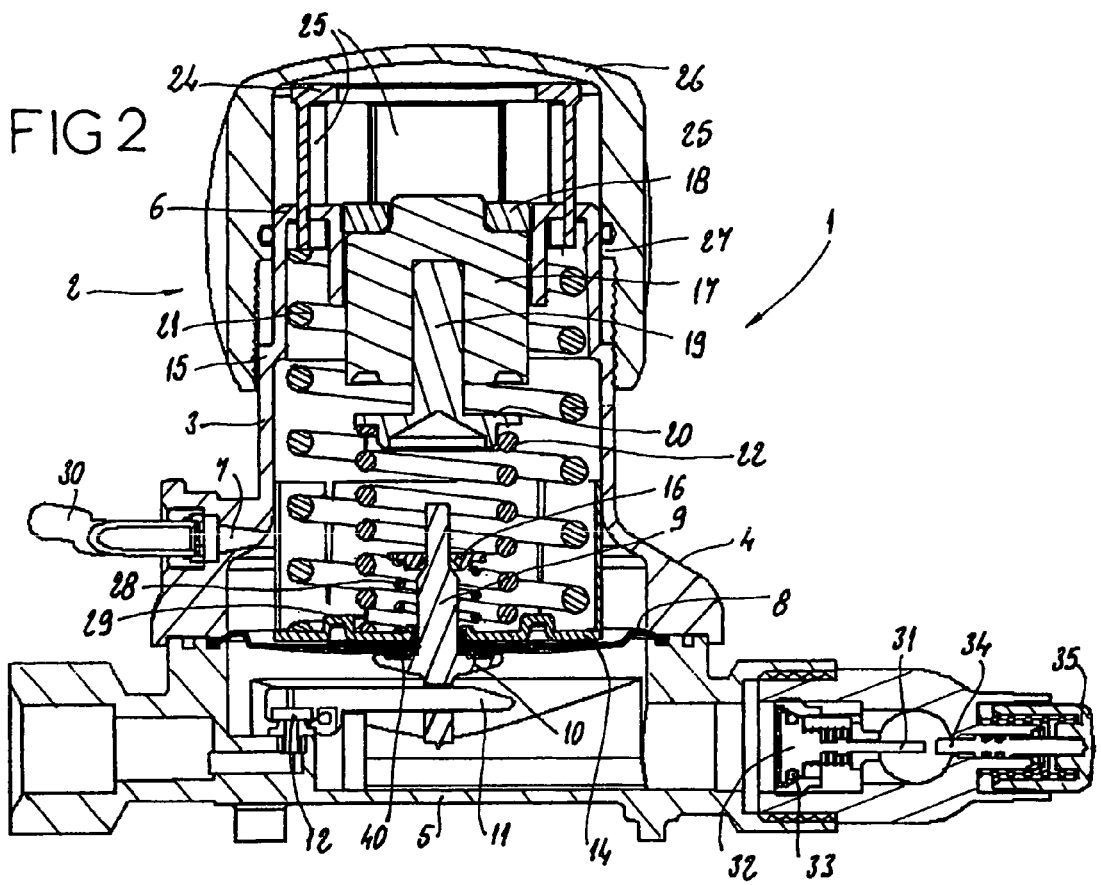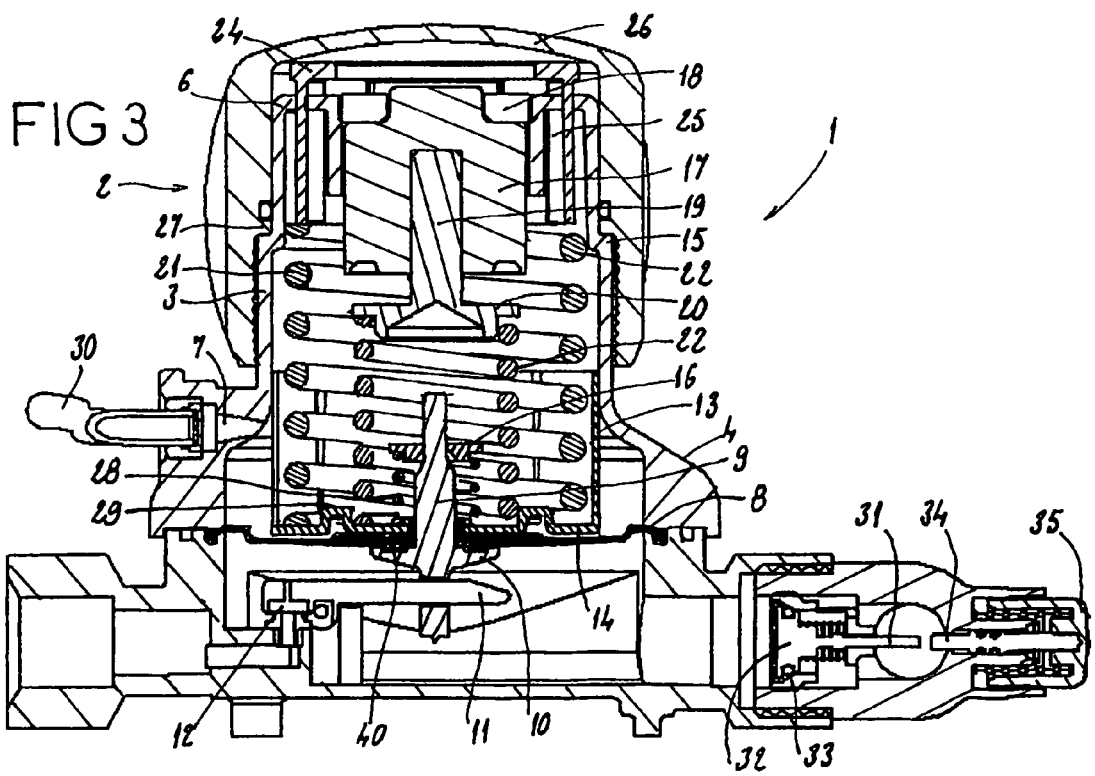

GAS REGULATOR WITH ALTIMETRIC ADJUSTMENT

The present invention relates to a gas regulator intended to be mounted on a gas supply pipe connecting a gas source to a user device.

The metering in the gaseous phase of gases intended for domestic and/or industrial use, such as natural gas or LPG (liquefied petroleum gas), is principally carried out with the aid of a volumetric meter positioned on the delivery pipework.

This solution has the advantage of being simple to implement and the measurement device is relatively economical. Nevertheless, since this type of meter is sensitive only to the volume of gas passing through it, it means that the generated totalization is proportional to this volume.

Like all gases, propane or LPGs have a volumic mass which varies according to their temperature, even if the pressure is kept at a constant value. Given that the mass flow may be defined as being the product of the volumic flow by the volumic mass, it follows that the mass flow circulating in a pipe cannot be calculated proportionally to the volumic flow indicated by the meter.

However, the measurement of the volumic flow does not reflect the reality of the consumption since the energy consumed by the user is directly proportional to the mass flow.

Document FR 2 786 865 describes just such a gas regulator used to deliver a volumic flow with pressure corrected according to the temperature of the gas. For this, a capsule containing a fluid or a liquefied gas is placed in the gas pipe. This capsule is connected by a capillary to a bellows exerting forces on a spring acting on the membrane of the regulator to which a pressure regulation mechanism is attached. Depending on the temperature of the gas circulating in the pipe, the pressure of the fluid contained in the capsule varies, and it follows that the forces exerted on the membrane also vary. Such a regulator is however awkward to produce because it is necessary to provide sealed passages from one volume to the other. In addition, the capillary must be mechanically protected.

Document FR 2 807 833 describes a gas supply device with determination of the volumic flow corrected for temperature and pressure. This device comprises in particular a regulator comprising a heat-sensitive member placed in a chamber at ambient temperature. Nevertheless, this device is relatively bulky and costly, and does not directly take account of the temperature of the gas entering the device.

Furthermore, like all gases, propane and LPG have a volumic mass that varies according to the altitude at which they are stored. Consequently, the measurement of consumption is falsified if this parameter is not taken into account. Specifically, a volumetric meter supplied at a given pressure will tend to indicate a gas totalization that increases as the altitude increases.

The principal aim of the present invention is to remedy the aforementioned disadvantage, and as a result relates to a gas regulator intended to be mounted on a gas supply pipe connecting a gas source to a user device, and comprising a pressure regulation mechanism controlled by the movement of a mobile element, characterized in that it comprises a casing containing at least one adjustable prestressed actuator acting on the mobile element and used to take account of the variation of the altimetric pressure.

Thus, since this actuator is adjustable, it is possible to modify the stresses applied to the mobile element controlling the regulator's pressure regulation mechanism in order to take account of the altitude at which the regulator lies.

Preferably, the adjustable prestressed actuator is made with the aid of a spring having, on the one hand, a first end resting against the mobile element, and, on the other hand, a second end resting against a member adjustable from the outside.

Again preferably, the adjustable member is made with the aid of an altimetric adjustable ring having a side wall resting on the second end of the spring.

Advantageously, a knurled cover covers the adjustable member and has an at least partially threaded inner face capable of interacting with a threaded portion of the side wall of the casing.

Again advantageously, the side wall of the casing is provided with a scale used to position the knurled cover appropriately according to the altitude. In addition, fastening means, for example a pin, a split ring or else a heat-deformable element, are preferably provided in order to immobilize the knurled cover after it has been correctly positioned.

Furthermore, in a regulator according to the invention, the gas temperature variation may also be taken into account so that the volumic flow delivered is pressure corrected. For this, a regulator according to the invention comprises a heat-sensitive member acting on the mobile element via at least one actuator.

Advantageously, the heat-sensitive member comprises a deformable inner wall and contains a variable volume element.

Again preferably, the actuator is made with the aid of a pushrod resting on an intermediate spring, said pushrod being inserted into the heat-sensitive member so as to come into contact with the deformable inner wall of the latter. This regulator is very simple to produce, and makes it possible to remedy the problem of the fragility inherent in the use of an external capillary.

According to a first variant embodiment of the invention, the body is covered by an insulating covering. The latter may, for example, be used to arrange an insulating air gap around the body, or else consist of a heat insulating material.

According to a second variant embodiment of the invention, the body is made of a low heat conducting material, particularly a thermoplastic with appropriate characteristics.

A regulator according to the invention may also comprise a relief system arranged at the mobile element. Preferably, the mobile element is made in the form of a membrane, and the relief system comprises, on the one hand, an end-piece attached to the pressure regulation mechanism, and, on the other hand, a rod passing through the membrane, a central spring being positioned around the rod in order to have a first end resting on the membrane and a second end fixedly attached to the rod. Specifically, in order to optimize the accuracy of regulation, it is desirable to use a mobile element in the form of a membrane whose diameter is as large as possible. However, in certain configurations, since the stresses transmitted by the membrane may exceed the stress generated by the heat-sensitive member, a relief system is therefore provided to be used to relieve said heat-sensitive member.

Preferably, the side wall of the casing comprises at least one orifice for releasing the flow of gas having passed through the relief system. In addition, a friction ring may be placed in the casing and have, on the one hand, a base slid between the membrane and the springs, and, on the other hand, a toothed side wall in contact with the inner face of the side wall of the casing.

Again preferably, a regulator according to the invention comprises a flow limiter system which is triggered for any flow greater than at least 20% of the nominal flow. This flow limiter system advantageously comprises a manual resetting member capable of acting on a blanking element.

Furthermore, if an extremely fine accuracy of measurement is sought, or if the flows to be managed are extremely high, as in the case of industrial or collective installations, it is entirely possible to use a regulator according to the invention as a driver of a large diameter regulator. In this case, the pressure delivered by the regulator that is the subject of the invention acts on the outer face of the mobile element of the larger diameter regulator.

FIG. 2 is a front view in longitudinal section of the regulator shown in FIG. 1, when the knurled cover is fully unscrewed.

FIG. 3 is a front view in longitudinal section of the regulator shown in FIG. 1, when the knurled cover is fully down.

Figure 1:
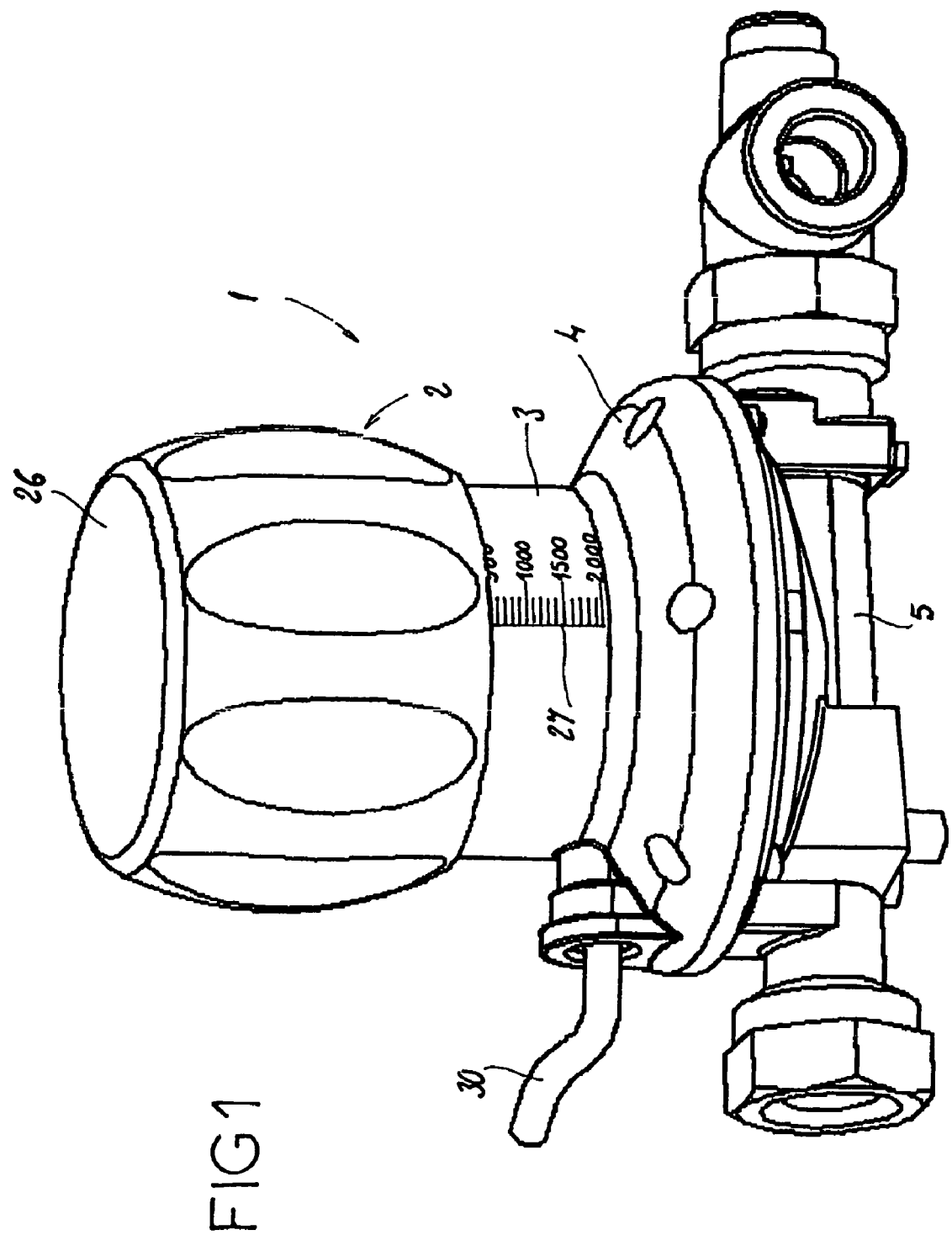
FIG. 1 is a view in perspective of a regulator according to the invention.

A regulator 1 according to the invention, as shown in FIGS. 1 to 3, is obtained based on a substantially tubular casing 2 which is made of a low heat conducting material, for example a thermoplastic with the appropriate characteristics. This casing 2 comprises a side wall 3 having, on the one hand, a bottom part 4 made fixedly attached to a main pipe 5 intended to be positioned on a gas supply pipe connecting a gas source to a user device (not shown), and, on the other hand, a top end 6 curved toward the interior of the casing 2. Furthermore, the side wall 3 has a side crank 15 and is furnished with an orifice 7 for the release of the gas flow.

A circular membrane 8 is attached at the line of junction between the main pipe 5 and the bottom part 4 of the casing 2. This membrane 8 comprises, on the one hand, a central orifice in which is inserted a rod 9 furnished with an end-piece 10, and, on the other hand, a circular pad 40. This rod 9 is finally housed in the casing 2 while its end-piece 10 remains in the main pipe 5. The end-piece 10 is designed in order to have a circular recess in which the pad 40 of the membrane 8 is housed.

Furthermore, the rod 9 is attached to an internal regulation mechanism. The latter comprises a valve 11 inserted in a central orifice exhibited by the end-piece 10 so as to be able to pivot about the rod 9, which is capable of interacting with a seat 12 fixedly attached to the main pipe 5.

A friction ring 13, housed in the casing 2, is placed resting on the membrane 8. This friction ring 13, as shown more particularly in FIG. 3, comprises, on the one hand, a base 14 which is placed in contact with the membrane 8 and which is furnished with a central perforation traversed by the rod 9, and, on the other hand, a circular toothed side wall whose diameter is slightly less than that of the casing 2 at the bottom part 4.

A small diameter central spring 28 is positioned around the rod 9 and has, on the one hand, a bottom end resting on the base 14 of the friction ring 13, and, on the other hand, a top end on which is fitted a toothed washer 16 then made fixedly attached to the rod 9.

A heat-sensitive member 17 on which is fitted an annular wedging element 18 is inserted in the casing 2. More precisely, the wedging element 18 is attached in the top end 6 of the casing 2, and the heat-sensitive member 17 is substantially tubular and therefore has a central internal channel. Furthermore, this heat-sensitive member 17 has, on the one hand, a rigid outer wall, and, on the other hand, a deformable inner wall, a variable volume element reacting according to the temperature variation being positioned between said outer and inner walls. A pushrod 19 having a substantially flat head 20 is slid into the central channel exhibited by the heat-sensitive member 17 so as to butt against the deformable wall of the latter.

A peripheral spring 21 and an intermediate spring 22 are also fitted into the casing 2. More precisely, the intermediate spring 22 comes to rest against the head 20 of the pushrod 19 and against the base 14 of the friction ring 13. The peripheral spring 21 is, for its part, wedged between, on the one hand, the base 14 of the friction ring 13, and, on the other hand, the bottom end of the side wall exhibited by an altimetric adjustment ring 24. This side wall consists of teeth 25 spaced at a distance from one another and capable of sliding through slots made in the curved top end 6 of the casing 2.

A knurled cover 26 is finally fitted onto the top end 6 of the casing 2 and is used to mask the altimetric adjustment ring 24. This knurled cover 26 has a partially threaded inner face capable of interacting with a threaded part exhibited by the side wall 3 of the casing 2. In addition, the knurled cover 26 has an inner shoulder 27 provided to butt against the side crank 15 of said side wall 3 when the knurled cover 26 is fully screwed onto the casing 2.

Before proceeding with the actual transfer of the gas from the gas source to the user device, it is necessary, in order to take account of the altitude at which said regulator 1 is used, to appropriately adjust the positioning of the altimetric adjustment ring 24 inside the casing 2 from the outside of the regulator 1. For this, the knurled cover 26 is screwed in or out. So doing, depending on the direction of rotation imposed, the altimetric adjustment ring 24 in the casing 2 may be moved upward or downward. The peripheral spring 21 may therefore be more or less compressed, and consequently determines the set point positioning of the membrane 8. As can be deduced from FIG. 1, this adjustment may be carried out in a relatively precise manner with the aid of a vertical scale 27 affixed to the side wall 3 of the casing 2. This scale 27 may for example lie between 0 and 2000 meters, and the bottom end of the knurled cover 26 may then serve as the cursor.

If the regulator 1 is installed definitively on a precise site, fastening means (not shown) may be provided in order to immobilize the knurled cover 26 and therefore prevent any modification of the altimetric adjustment after the regulator 1 has been placed in service.

Furthermore, such a regulator 1 can also be used to deliver a pressure-corrected volumic flow according to the ambient temperature. Specifically, the variable volume element of the heat-sensitive member 17 is made to expand or contract virtually instantaneously, and the forces exerted on the intermediate spring 22 by means of the pushrod 19 are consequently modified. Since the intermediate spring 22 rests on the membrane 8, it follows that the positioning of the latter varies, and the valve 11 moves toward or away from the seat 12 depending on whether the membrane 8 rises or falls. Finally, the gas passing through the main pipe 5 is delivered at a pressure corrected according to the ambient temperature.

Advantageously, as can be deduced from FIGS. 2 and 3, the base 14 of the friction ring 13 has, on the one hand, a circular protrusion 29 making it possible to wedge the peripheral spring 21 and the intermediate spring 22 inside the casing 2, and, on the other hand, a central rim enclosed by the bottom end of the central spring 28.

In addition, in order to compensate for any relative excess pressure in the downstream part of the regulator 1, a release system is arranged in the main pipe 5 in order to release a flow of gas from said main pipe 5 to the inside of the casing 2, until the nominal pressure is re-established downstream of the regulator 1.

More precisely, in the event of excess pressure of this type, the rod 9 remains fixed, and the membrane 8 is made to move away from the end-piece 10 of the rod 9, thereby exerting forces on the main spring 28. The latter is then compressed between, on the one hand, the base 14 of the friction ring 13 which is moved with the membrane 8, and, on the other hand, the washer 16 fixedly attached to the rod 9. So doing, a flow of gas may therefore escape from the main pipe 5 to the casing 2 by passing through the central orifice of the membrane 8. After having passed through the grooves exhibited by the toothed side wall of the friction ring 13, this flow of gas may be finally drawn off from the regulator 1 thanks to the release orifice 7 exhibited by the side wall 3 of the casing 2.

As shown in FIG. 1, a flexible pipe 30 may be connected to this release orifice 7 in order to channel the flow of released gas into a desired zone. When the excess pressure ceases, the main spring 28 tends to resume its rest position and forces the membrane 8 to resume its initial location.

Finally, in order to protect the installation and prevent undesirable major gas leaks originating from the breakage of any element of the installation downstream of the regulator 1, the latter is provided with a flow limiter system which intervenes for any flow greater than at least 20% of the nominal flow. This flow limiter system is made from a spring-mounted blanking element and a manual resetting member also spring-mounted.

More precisely, the blanking element is made up of a piston 31 and a flat head 32. The latter is situated in a frustoconical housing and is provided with an annular seal 33. Furthermore, the resetting member comprises, on the one hand, a rod 34 positioned in the extension of the piston 31, and, on the other hand, a cover 35 to which said rod 34 is connected.

In the event of a flow greater than at least 20% of the nominal flow, the piston 31 moves in translation and forces the seal 33 to press against the edge of the frustoconical housing. The main pipe 5 is then blanked off by the flat head 32 and the flow is stopped.

When normal delivery conditions are re-established, it is sufficient to press on the cover 35 of the resetting member, the rod 34 then coming into contact with the piston 31 and forcing the latter to resume its initial location.

This flow limiter system also protects the installation when it is being pressurized, during a transition from a no pressure situation to a working pressure situation. Specifically, in this situation, the flow limiter system comes into action and protects the downstream installation from the rapid rise in pressure. A manual resetting intervention is then used to carry out the slow pressurization of the whole downstream installation.

Although the invention has been described in relation to particular exemplary embodiments, it is clearly evident that it is in no way limited and that it comprises all the technical equivalents of the means described and their combinations if the latter enter the scope of the invention.

The invention claimed is:

1. A gas regulator intended to be mounted on a gas supply pipe connecting a gas source to a user device, and comprising a pressure regulation mechanism controlled by the movement of a mobile element, said mechanism comprising:
   a casing containing at least one adjustable prestressed actuator acting on the mobile element and used to take account of the variation of the altimetric pressure, and
   a variable volume heat-sensitive element acting on said mobile element via actuation means, wherein said actuation means comprise another prestressed actuator.

2. The regulator as claimed in claim 1, wherein the adjustable prestressed actuator comprises a first spring having, on the one hand, a first end resting against the mobile element, and, on the other hand, a second end resting against a member adjustable from the outside.

3. The regulator as claimed in claim 2, wherein the adjustable member comprises an altimetric adjustable ring having a side wall resting on the second end of the first spring.

4. The regulator as claimed in claim 2, wherein a knurled cover covers the adjustable member.

5. The regulator as claimed in claim 4, wherein the knurled cover has an at least partially threaded inner face capable of interacting with a threaded portion of the side wall of the casing.

6. The regulator as claimed in claim 4, wherein the side wall of the casing is provided with a scale used to position the knurled cover appropriately according to the altitude.

7. The regulator as claimed in claim 1, wherein said another prestressed actuator comprises a second spring.

8. The regulator as claimed in claim 7, wherein said heat-sensitive member comprises a deformable inner wall.

9. The regulator as claimed in claim 8, wherein said another prestressed actuator comprises a pushrod resting on said spring, said pushrod being inserted into said heat-sensitive member so as to come into contact with the deformable inner wall of the latter.

10. The regulator as claimed in claim 1, wherein a relief system is arranged at the mobile element.

11. The regulator as claimed in claim 10, wherein the mobile element is made in the form of a membrane, and in that the relief system comprises, on the one hand, an end-piece attached to the pressure regulation mechanism, and, on the other hand, a rod passing through the membrane, a central spring being positioned around the rod in order to have a first end resting on the membrane and a second end fixedly attached to the rod.

12. The regulator as claimed in claim 10, wherein the side wall of the casing comprises at least one orifice for releasing the flow of gas having passed through the relief system.

13. The regulator as claimed in claim 1, wherein a friction ring is placed in the casing and has, on the one hand, a base slid between the mobile element and the springs, and, on the other hand, a toothed side wall in contact with thinner face of the side wall of the casing.

14. The regulator as claimed in claim 1,
   comprising a flow limiter system which is triggered for any flow greater than at least 20% of the nominal flow.

15. The regulator as claimed in claim 14,
   wherein the flow limiter system comprises a manual resetting member capable of acting on a blanking element.

* * * * *